Feb. 4, 1964  B. E. BALTHAZOR  3,120,081
SPRUNG AXLE FOR TOY VEHICLE
Filed Jan. 22, 1962
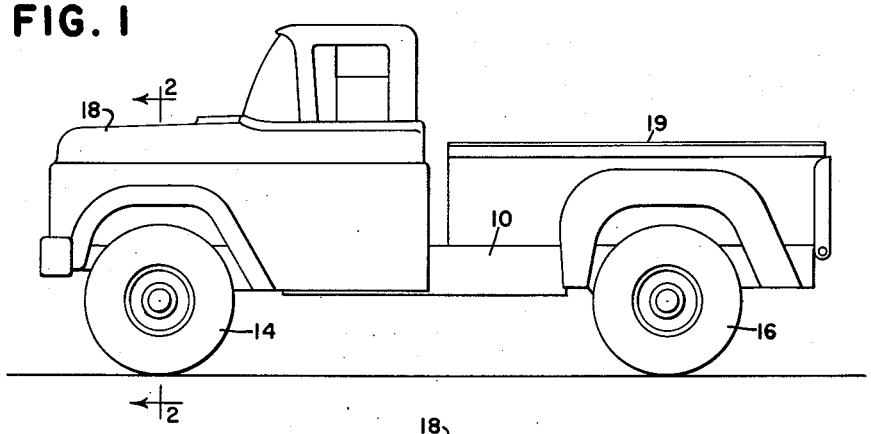
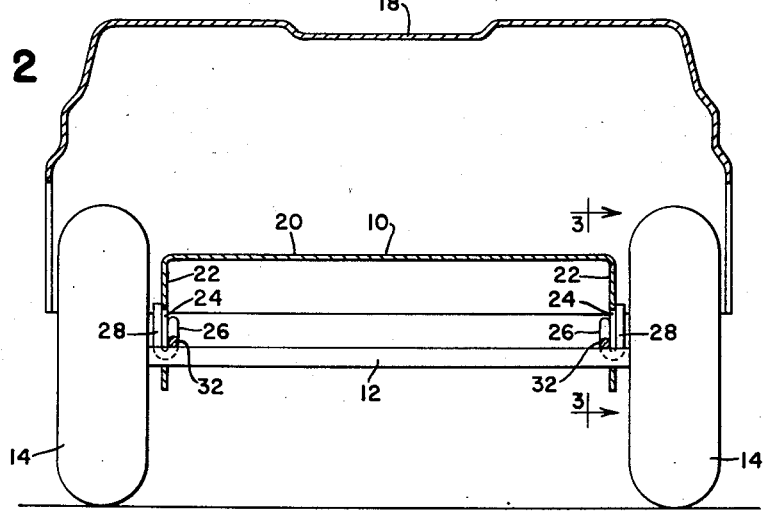
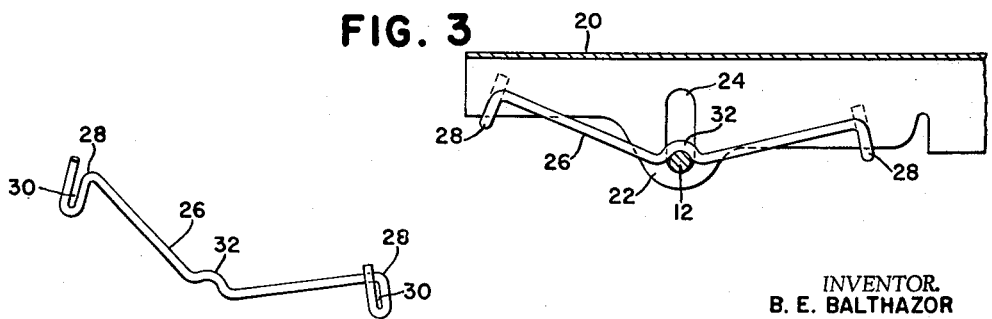
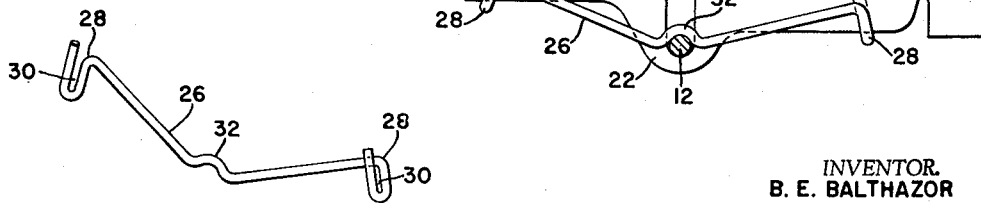
INVENTOR.
B. E. BALTHAZOR
BY
ATTORNEY United States Patent Office 3,120,081
Patented Feb. 4, 1964

3,120,081
SPRUNG AXLE FOR TOY VEHICLE
Bernard E. Balthazor, Moline, Ill., assignor to Buddy L Corporation, East Moline, Ill., a corporation
Filed Jan. 22, 1962, Ser. No. 167,802
5 Claims. (Cl. 46—221)

This invention relates to a toy vehicle and more particularly to improved means for spring-mounting the front and rear axles thereof.

It is a principal object of the invention to provide improved spring mountings, preferably in the form of four individual springs, two for each of the front and rear axles. A further object of the invention resides in means for readily mounting and dismounting the springs so that installation thereof lends itself readily to mass-production methods. A still further object resides in a spring construction in which the wheels will simulate individual spring suspension, adding realism to the scale model vehicle.

The foregoing and other important objects and desirable features inherent in and encompassed by the invention will become apparent as a preferred embodiment thereof is disclosed in detail in the ensuing description and accompanying sheet of drawings, the figures of which are described below.

FIGURE 1 is a side elevational view of a representative toy vehicle.

FIGURE 2 is an enlarged section as seen generally along the line 2—2 of FIGURE 1.

FIGURE 3 is a fragmentary section as seen along the line 3—3 of FIGURE 2.

FIGURE 4 is a perspective of one of the individual springs.

The vehicle chosen for purposes of illustration comprises a longitudinal or fore-and-aft body 10 carried on front and rear wheel and axle assemblies, the front wheel assembly including a transverse axle 12 and right- and left-hand front wheels 14. The rear axle is not shown by itself but its presence will be apparent from the showing of the left-hand rear wheel at 16. It will be clear, of course, that there is another similar wheel coaxial with the wheel 16 that does appear. The vehicle is a scale model pick-up truck having a forward cab and hood structure 18 and a rear cargo-carrying body part 19; although, the principle of the invention can be applied to vehicles of any type.

As best shown in FIGURE 2, the body 10 is preferably of inverted U-shaped or channel cross section, having a transverse upper part 20 and opposite depending side parts 22, which of course extend fore and aft. The parts 22 in the area of the respective axle, as in the case of the front axle 12, may be configured as shown in FIGURE 3 and may further be provided respectively with generally upright slots 24 which loosely receive and vertically guide the associated axle. It will be understood, of course, that duplicate construction may be carried out at the rear end of the vehicles so that all four wheels are individually movable upwardly and downwardly relative to the body.

In the case of the front axle 12, it is biased downwardly toward the bottom of the slots 24 by a pair of spring members 26, one of which is shown by itself in FIGURE 4 and one of which is shown in installed position in FIGURE 3. Both springs appear in section in FIGURE 2. In its installed or assembled position, each spring 26 has its opposite ends in the form of upwardly directed hook elements 28, the spring preferably being constructed of suitable spring wire or equivalent material and the hook elements being formed by bending the end portions of the spring as shown, so that each hook element has therein a relatively narrow upwardly directed slot 30, the width of which is approximately on the order of the thickness of the material of which the flanges 22 are formed, which in this case is relatively heavy gage sheet metal. An intermediate part of the spring 26, as at 32, is upwardly arced or bowed so as to conform at least in part to the associated portion of the axle 22 to which it is proximate, it being understood that each spring 26 lies closely alongside and laterally inwardly of its associated flange or depending portion 22. Installation of the spring is accomplished by temporarily distorting same so that the portion 32 engages the axle 12 from above, followed by snapping the hook elements 28 into place so that fore-and-aft spaced apart portions of the associated flange 22 are engaged from below and are received in the slots 30. Installation of this type makes the springs readily adaptable to mass-production methods.

Broadly construed, the slotted hook elements 28 provide means for preventing lateral displacement of the spring 26 relative to the body and axle, while the bowed portion 32 prevents fore-and-aft displacement of the spring relative to the axle. Thus, the two-way function of the connecting portions 28 and 32 facilitates retention of the spring; yet, permits ready removal thereof for any purpose.

When the axle 12 is deflected upwardly so that it travels toward the top of its slot, the intermediate portion 32 of the spring of course moves upwardly and the hook elements 28 provide fulcra about which the ends may pivot as the spring becomes distorted. In a vehicle with similar springs at both front and rear, any "corner" of the vehicle can be depressed, and the springs will accommodate the other corners of the vehicle.

Briefly characterized, each spring is in the form of a snap-in, snap-out assembly. Mass-production methods may be applied readily to the production of the springs themselves, since they are readily formed from appropriate lengths of spring wire. Features and advantages other than those categorically enumerated will readily occur to those versed in the art, as will many modifications and alterations in the preferred embodiment disclosed, all of which may be achieved without departure from the spirit and scope of the invention.

What is claimed is:

1. In a toy vehicle, a fore-and-aft body including a portion of inverted U-shape in section and having a transverse upper part and a pair of transversely spaced apart fore-and-aft flanges depending from said upper part, each flange having therein a generally upright guide slot and said slots being transversely alined, a transverse axle passed through and loosely received in said slots and guided thereby for vertical movement relative to the body portion, and spring means acting between the body portion and axle for biasing the axle downwardly and comprising a pair of fore-and-aft spring members lying respectively alongside said body portion flanges, each member having opposite ends in the form of upwardly opening hook elements engaging the associated flange from below respectively ahead of and behind the axle and an intermediate portion engaging the proximate part of the axle from above.

2. The invention defined in claim 1, in which: each intermediate portion is shaped to conform at least in part to the proximate part of the axle engaged thereby.

3. In a toy vehicle, a fore-and-aft body including a portion of inverted U-shape in section and having a transverse upper part and a pair of transversely spaced apart fore-and-aft flanges depending from said upper part, each flange having therein a generally upright guide slot and said slots being transversely alined, a transverse axle passed through and loosely received in said slots and guided thereby for vertical movement relative to the body portion, and spring means acting between the body portion and axle for biasing the axle downwardly and comprising a pair of fore-and-aft spring members lying respectively alongside said body portion flanges, each member having opposite ends engaging the associated flange respectively ahead of and behind the axle and an intermediate portion engaging the proximate part of the axle from above, said ends acting upwardly on the flange and said intermediate portion acting downwardly on the axle, said ends being so shaped and constructed as to normally retain engagement with the respective flanges because of the bias in the spring.

4. The invention defined in claim 3, in which: said ends of each spring member engage the flange to prevent lateral displacement of its spring member relative to said flange and said intermediate portion of each spring member includes means engaging the axle via the bias in said spring and preventing relative fore-and-aft displacement of said spring member.

5. In a toy vehicle, a fore-and-aft body including a portion of inverted U-shape in section and having a transverse upper part and a pair of transversely spaced apart fore-and-aft flanges depending from said upper part, each flange having therein a generally upright guide slot and said slots being transversely alined, a transverse axle passed through and loosely received in said slots and guided thereby for vertical movement relative to the body portion, and spring means acting between the body portion and axle for biasing the axle downwardly and comprising a pair of fore-and-aft spring members lying respectively alongside said body portion flanges, each member comprising a single elongated part having an end portion in the form of an upwardly opening hook element engaging the associated flange from below and in fore-and-aft spaced relation to the axle and further having another portion engaging the axle from above.

References Cited in the file of this patent
UNITED STATES PATENTS

| | | |
|---|---|---|
| 1,685,592 | Arden | Sept. 25, 1928 |
| 2,006,423 | Turner | July 2, 1935 |